(12) United States Patent
Brassil et al.

(10) Patent No.: US 8,296,309 B2
(45) Date of Patent: Oct. 23, 2012

(54) SYSTEM AND METHOD FOR HIGH PRECISION AND HIGH RECALL RELEVANCY SEARCHING

(75) Inventors: Daniel Paul Brassil, Jupiter, CA (US); Christopher Michael Hogan, San Mateo, CA (US); Bruce Hedin, Monterey, CA (US); Teresa Sunshine Jade, Durham, NC (US); Robert S. Bauer, Portola Valley, CA (US)

(73) Assignee: H5, San Francisco, CA (US)

( * ) Notice: Subject to any disclaimer, the term of this patent is extended or adjusted under 35 U.S.C. 154(b) by 235 days.

(21) Appl. No.: 12/789,948

(22) Filed: May 28, 2010

(65) Prior Publication Data
US 2010/0306206 A1 Dec. 2, 2010

Related U.S. Application Data

(60) Provisional application No. 61/182,194, filed on May 29, 2009.

(51) Int. Cl.
*G06F 7/00* (2006.01)

(52) U.S. Cl. ......... 707/758; 704/251; 707/748; 707/754
(58) Field of Classification Search .................. 704/251; 707/748, 754, 758
See application file for complete search history.

(56) References Cited

U.S. PATENT DOCUMENTS

| | | | | |
|---|---|---|---|---|
| 7,716,226 | B2 * | 5/2010 | Barney | 707/748 |
| 8,126,882 | B2 * | 2/2012 | Lawyer | 707/723 |
| 8,180,751 | B2 * | 5/2012 | Zhang | 707/705 |
| 2006/0089924 | A1 * | 4/2006 | Raskutti et al. | 707/1 |
| 2006/0212142 | A1 * | 9/2006 | Madani et al. | 700/49 |

* cited by examiner

*Primary Examiner* — Cheyne Ly
(74) *Attorney, Agent, or Firm* — Lowenstein Sandler PC

(57) ABSTRACT

A method and system for performing high precision and high recall relevancy searching is provided. According to embodiments of the present invention, a relevance rule is generated based on a user model and language from within one or more relevant and non-relevant documents. A query is created based on the relevance rule wherein the query may be applied to a corpus to identify relevant and non-relevant documents. The relevance rule may be iteratively refined in order to increase the accuracy of the query. The resulting query may be used by a litigator during the discovery phase of a litigation to respond to a request for production.

20 Claims, 3 Drawing Sheets

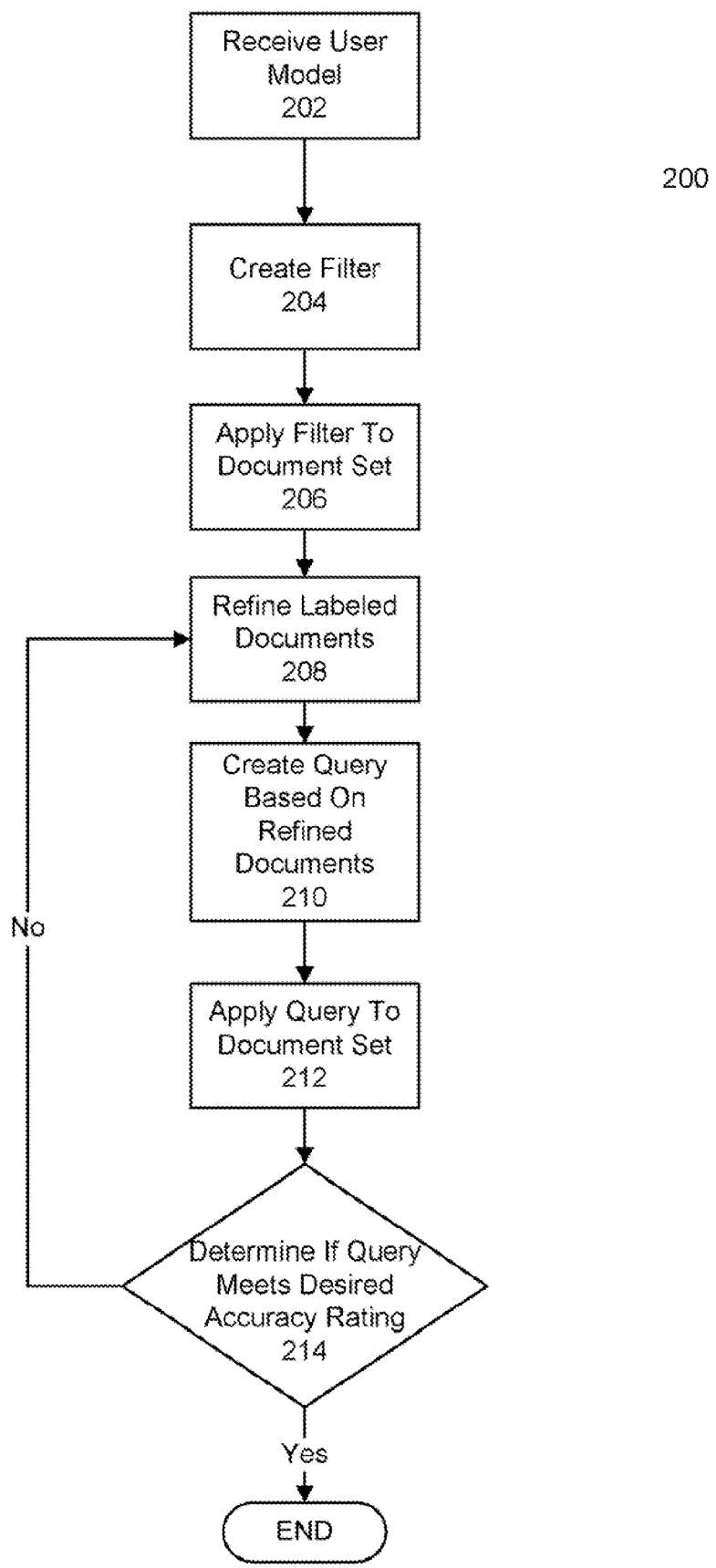

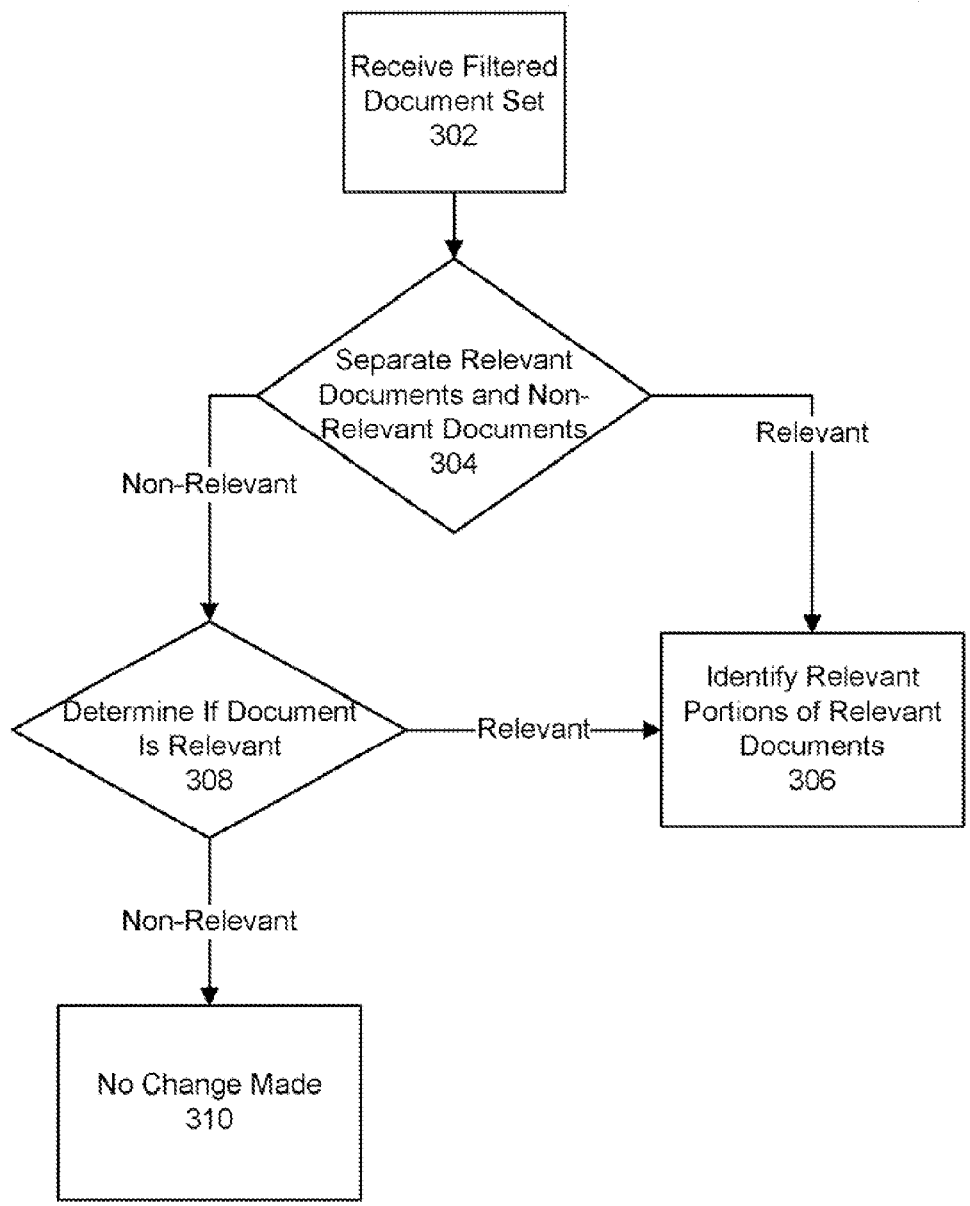

SYSTEM AND METHOD FOR HIGH PRECISION AND HIGH RECALL RELEVANCY SEARCHING

CROSS-REFERENCE TO RELATED APPLICATION

This application claims the benefit of U.S. Provisional Patent Application No. 61/182,194, filed May 29, 2009, titled, "Human-Augmented Computer Cognition: User Modeling, Text Classification, and Their Optimization for High Recall with High Precision Information Retrieval," which is herein incorporated by reference.

FIELD OF THE INVENTION

The present invention relates generally to a method and system for identifying relevant and non-relevant documents within a corpus. More specifically, embodiments of the present invention relate to a method and system for creating one or more queries which may be applied to a corpus to identify relevant and non-relevant documents.

BACKGROUND OF THE INVENTION

The effectiveness of an information identification system is measured by how well the system identifies relevant documents within a corpus. Relevance is a property derived from a user and an information need, in other words, a document is deemed relevant by a user if it satisfies that user's information need.

According to conventional information identification systems, the definition of what makes a document relevant or non-relevant exists independently of the information identification system. Conventional information identification systems assume that the user of the system has a preexisting, well-defined and unchanging notion of relevance, and that it is the purpose of the system to identify any documents that are relevant according to that fixed notion of relevance.

For certain types of information needs, the assumption of fixed relevance may be reasonable. For example, in known-item search, the user is attempting to find an item that he or she knows to exist, such as querying a library's search engine with a specific book's title to locate that book within the library.

For more complex types of information needs, the idea of fixed relevance breaks down. For example, a user may approach a search task seeking to resolve an anomalous state of knowledge. In such an example, the user often cannot precisely specify what information is needed to resolve his or her anomalous knowledge-state. In these situations, an exploratory information need exists with the assumption that certain aspects of the information need are initially undefined, and will be further refined through interaction with an information identification system. Even if the user does have a well-defined notion of relevance at the outset, that notion of relevance may change as a user reviews certain documents. For example, documents returned by the information identification system may contain information for which the user was not previously aware, which may, in turn, refine or change the user's notion of relevance. However, conventional information identification systems lack a method of refining a user's notion of relevance in response to information contained in the documents being reviewed or documents that have been previously reviewed.

Conventional information identification systems also operate under the assumption that the user is only interested in a subset of highly relevant documents. For certain information needs, such as the above-mentioned known-item search, a precision-oriented approach is appropriate. In this case, the relevant set usually consists of one document, and therefore a limited search may be effective. However, for more complex information identification tasks, there is a need for the ability to expand the scope of a search. By not expanding the scope of a search, conventional information identification systems fail to identify relevant documents within a corpus.

As a result, there is a need in the art for a method and system to assist in information identification that allows a user's notion of relevance to change and expand in response to information contained in documents being reviewed.

SUMMARY OF THE INVENTION

Embodiments of the present invention satisfy these needs and others by providing a method and system for performing high precision and high recall relevancy searching. According to certain embodiments of the present invention, a query is generated that may be applied to a corpus of documents to identify relevant and non-relevant documents within the corpus. An accuracy rating may be used to determine the accuracy with which the query correctly identifies documents as relevant and non-relevant. The query may be updated based on information contained in the reviewed documents to increase the associated accuracy of the query.

According to certain embodiments of the present invention, a user provides information to define a user model. The term "user model" is intended to include, but is not limited to, information, rules, and/or parameters that are relied on to identify documents as relevant or non-relevant. According to an embodiment of the present invention wherein the user is a senior attorney working on a litigation, the user model may include information utilized when responding to a given request for production. The information may be based on a user's knowledge of a given topic or experience within a specific field. The user model defines a relevance rule used to identify relevant documents in conformity with the request for production. The term "relevance rule" is intended to include, but is not limited to, a set of attributes used to identify documents as relevant or non-relevant, derived in part from the information within the user model. According to certain embodiments of the present invention, the user model is based on information gathered from more than one person.

Embodiments of the present invention provide for an iterative process of refining a relevance rule, and queries based on the relevance rule, to allow for documents within a corpus to be more accurately identified as relevant or non-relevant. According to such embodiments, an initial filter is applied to a corpus of documents thereby identifying a set of relevant documents. The set of relevant documents is then reviewed by an assessor to identify relevant or key language within each relevant document. Based on the identified language, the relevance rule is updated, thereby refining the relevance rule to allow for more accurate document identification.

An embodiment of the present invention provides for identifying one or more relevant documents, comprising the computer-implemented steps of generating a filter for identifying a relevant document based on an initial relevance rule related to a set of documents, applying the filter to the set of documents thereby identifying a subset of relevant documents, receiving the subset of relevant documents comprising an identification of key information, generating an updated relevance rule based on the key information and the initial relevance rule, generating a query for searching the set of documents to identify a second subset of relevant documents based on the updated relevance rule, and outputting the set of documents wherein the relevant documents have been identified.

BRIEF DESCRIPTION OF THE DRAWINGS

The present invention will be more readily understood from the detailed description of exemplary embodiments presented below considered in conjunction with the attached drawings, of which:

FIG. 2 illustrates an exemplary method for identifying relevant documents, according to an embodiment of the present invention; and FIG. 3 illustrates an exemplary method for refining a set of filtered documents, according to an embodiment of the present invention.

DETAILED DESCRIPTION OF THE DRAWINGS

Figure 1:
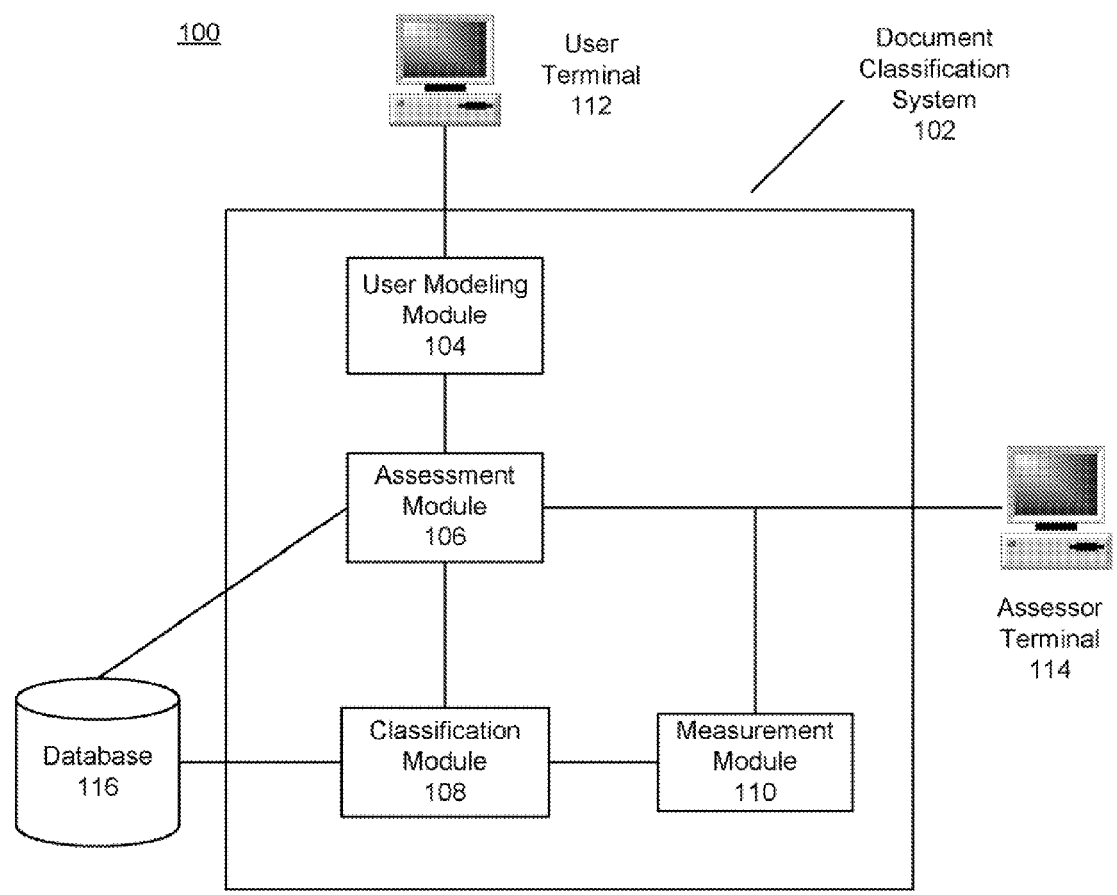
FIG. 1 illustrates an exemplary system for identifying relevant documents, according to an embodiment of the present invention.

Embodiments of the present invention relate to a system and method for classifying documents as relevant or non-relevant. The bounds of what constitutes a relevant document is often grounded in a document production request received during the discovery stage of litigation. In this example, it is the task of an attorney to interpret the document production request and create a user model that defines the relevance rule used to perform an initial search for relevant documents within a document set (i.e., corpus). Based on the results from the initial search, embodiments of the present invention isolate the key information within the identified relevant documents and refine a relevance rule based on the key information. As used herein, the term "key information" includes, but is not limited to, any word, term, and/or phrase within a document that may be used to identify a document as relevant or non-relevant. By refining the relevance rule, embodiments of the present invention generate queries to accurately identify additional relevant documents, as well as create additional queries that result in greater accuracy in identifying relevant documents. Given that the relevance rule may be refined, the identification of a document as "relevant" or "non-relevant" may be altered as the relevance rule is refined.

FIG. 1 illustrates a Data Network 100 according to an embodiment of the present invention. As illustrated in FIG. 1, the Data Network 100 includes a Document Classification System 102 comprising: a User Modeling Module 104, an Assessment Module 106, a Classification Module 108, and a Measurement Module 110, communicatively connected to a User Terminal 112, an Assessor Terminal 114 and a Database 116. As used herein, the term "module" is intended to include, but is not limited to, one or more computers configured to execute one or more software programs configured to perform one or more functions. The term "computer" is intended to include any data processing device, such as a desktop computer, a laptop computer, a mainframe computer, a personal digital assistant, a server, a handheld device, or any other device able to process data. The aforementioned components of the Data Network 100 represent computer hardware and/or computer-implemented software modules configured to perform the functions described in detail below. One having ordinary skill in the art will appreciate that the components of the Data Network 100 may be implemented on one or more communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers.

The features and functionality of embodiments of the Data Network 100 and its components are described in detail in connection with the system diagram of FIG. 1 and the process flow diagram of FIG. 2. As illustrated in FIG. 1, the User Modeling Module 104 is communicatively connected to the User Terminal 112. At step 202 of method 200 illustrated in FIG. 2, the User Modeling Module 104 communicates with the User Terminal 112 to create a user model. A user interacts with the User Terminal 112 to provide information used by the User Modeling Module 104 to formulate a user model. Embodiments of the present invention utilize the user model to construct a relevance rule. According to certain embodiments of the present invention, a relevance rule may comprise a list of words or phrases that may appear in relevant documents. According to another embodiment of the present invention, a relevance rule may comprise a list of Boolean queries, including connectors such as AND, OR and NOT. According to another embodiment of the present invention, a relevance rule may comprise a weighted bag-of-words or clustering model that serves to segregate relevant documents.

The user accessing the User Terminal 112 may be an individual (i.e., attorney) or system that can formulate the description and/or definition of a relevant document as defined in a request for production. A user model may be created to capture this knowledge. The User Modeling Module 104 may gather information from more than one user when creating a user model.

According to certain embodiments of the present invention, the user model comprise four elements: (i) a use case, (ii) scope (iii) nuance and (iv) linguistic variability. The resultant representation of the user case, scope, nuance, and linguistic variability is a description of subject matter, that, if found in a document, would make that document relevant. The User Modeling Module 104 receives information from the User Terminal 112 regarding use case, scope, nuance and linguistic variability to form a user model based on this information. A user model is a structured hierarchical representation of the scope of the subject matter, together with a database of variants of nuance and linguistic variability and a written description of one or more use cases.

A use case describes the high-level aspects of a user's objectives, including meta-objectives, allowing the Document Classification System 102 to balance those needs appropriately. For example, while the need of the user may be to produce to opposing counsel a set of responsive documents which is not under or overly inclusive. In this regard, a user stressing under-production implies a narrow, more exclusive conception of relevance whereas over-production implies a broad, more inclusive conception of relevance.

Scope may be utilized when defining a user model to reflect the breadth of concepts considered relevant by a user. Within a user model, scope defines the boundaries of relevance for a given conceptual domain. For example, scope may define the breadth of relevance in terms of temporal bounds, parties of interest, product line, or any other attribute that could limit the user's concept of relevance. A user analyzes a request for production and defines the scope accordingly. For example, if utilized to define a user model implemented in response to a request for production in a tobacco-related litigation, the user may limit the scope of relevant sales documents to information regarding sales of cigarettes between 1983 and 1992.

Nuance refers to the degree that is required for a document to be deemed relevant. Nuance typically centers on the semantic relations of hyponymy and hypernymy. In some cases, a general representation of the concept, (e.g. dog) may be considered relevant in addition to specific instances (e.g. dachshund). For other cases, only the more specific instance of a term/concept will suffice for relevance.

Finally, linguistic variability is utilized to form a user model. Linguistic variability is related to, but distinct from, nuance. Linguistic variability may be defined as the variety of ways a concept can be expressed, whether lexically or syntactically. Two approaches are common: defining each concept as a closed set or defining each concept in terms of pertinent characteristics. As an example, the concept of "dog" may be defined either as a closed class of all known types of dog: "schnauzer", "dachshund", "german shepherd", etc., or as a member of the class of highly social, carnivorous or omnivorous mammals of the subspecies *Canis lupus familiaris*.

According to embodiments of the present invention, an initial relevance rule is generated based on the user model. Given that the user model reflects the user's understanding of what constitutes a relevant and non-relevant document, the initial relevance rule based on a user model includes words or phrases (i.e., key information) that are used to identify relevant and non-relevant documents. For example, a user model related to a request for production in a tobacco litigation could define the scope as documents between 1983 and 1992, which mention the word "cigarette," with the nuance of also including, "cigar." An initial relevance rule based on this user model may define a relevant document as any document dated between 1983-1992 which contains the words "cigarette" or "cigar." Furthermore, the initial relevance rule may define documents dated before 1983 and after 1992 as non-relevant.

Following the creation of the user model and the corresponding initial relevance rule, method 200 continues by generating a filter based on the user model, at step 204. The filter may be a searching function based on the initial relevance rule that may be applied to a corpus by the Assessment Module 106 to identify a document as either relevant or non-relevant.

According to certain embodiments of the present invention, the Assessment Module 106 utilizes the filter to identify documents within a set of documents as either relevant or non-relevant, at step 206. A filter may include one or more queries or rules configured to identify relevant and non-relevant documents within a set of documents. The Assessment Module 106 may retrieve a set of documents from the Database 116 and apply the filter to the set of documents to identify the relevant and non-relevant documents.

According to certain embodiments of the present invention wherein a rule within a filter includes a list of relevant words, application of the filter comprises grouping the set of documents into one more clusters based on the topic addressed in each document. The topic addressed in each cluster is then compared to each of the relevant words identified in the filter. Documents included in a cluster associated with a topic that match one of the words identified as relevant are labeled "relevant," while documents included in a cluster not associated with a term identified as relevant are labeled "non-relevant."

In an alternative embodiment of the present invention wherein the filter is a list of relevant words, application of the filter comprises first expanding the list of relevant words to include morphological alterations and synonyms of the limited list. A keyword search may then be conducted on the set of documents to identify documents within the document set which contain any of the words included on the expanded list of relevant words. Each of the identified documents are labeled as "relevant," while documents that are not found to include any of the relevant words are labeled as "non-relevant." Optionally, the process of keyword searching may also be conducted without expanding the original list of relevant words.

According to embodiments of the present invention wherein keyword searching is performed when applying a filter to a set of documents, the set of documents is indexed prior to performing key word searching. Creating an index of the documents within the set of documents decreases processing time when performing a subsequent keyword search. Once the documents have been indexed, a keyword search is performed on the indexed set of documents.

Following the application of the filter to a document set at step 206, method 200 continues at step 208, by refining the labeled documents. When refining the labeled documents, the Assessment Module 106 attempts to confirm that a document labeled "relevant" or "non-relevant" is in fact correctly labeled and to isolate the key information within a document correctly labeled as "relevant" that triggered the identification. In doing so, the Assessment Module 106 ensures that that the documents within the document set are properly labeled and further adds value by isolating or highlighting the key information within the "relevant" documents. The refining subprocess of step 208 is described in greater detail in reference to FIG. 3.

Method 300 illustrated in FIG. 3 describes the process of refining the labeled documents, according to an embodiment of the present invention. The refining process of 300 begins by receiving the labeled documents, at step 302. According to certain embodiments of the present invention wherein the Classification Module 108 creates the labeled document set, the Assessment Module 104 receives the labeled document set from the Classification Module 108.

As described above, the labeled document set may contain one or more relevant documents and one or more non-relevant documents. At step 304 of process 300, the relevant documents and the non-relevant documents of the labeled document set are separated.

According to certain embodiments of the present invention, the key information of each relevant document is identified, at step 306. The key information of a relevant document refers to the word, phrase, combination of characters, term, passage or passages in a document that results in a document being labeled as relevant. An exemplary implementation of an embodiment of the present invention may involve a review of documents in the context of a litigation relating to an oil spill and an initial relevance rule which includes the word "hull." As such, the filter may have identified a document as relevant by searching for the term "hull." However, at step 306, the relevant document may be reviewed to determine if the document containing the word "hull" also contains additional words or phrases that may be beneficial when searching for additional relevant documents. In the example, at step 306, the process determines that the information of a document which contains the word "hull" also includes a relevant term "oil bladder," which is commonly used to house oil within the hull of a ship. As a result, the term "oil bladder" or the passage which contains this phrase may be identified as key information. By reviewing a relevant document for key information, additional search terms may be identify that could be used to form or refine search queries. Additional relevant words are identified by computer from the key information. Relevant words are identified by removing likely unimportant "stop" words from the key information, and then hypothesizing queries based on the remaining words. The queries are evaluated against the set of know relevant and irrelevant documents and high performing queries are retained. Therefore, instead of relying exclusively on the user model to define the relevance rule, review of a relevant document for key information results in the identification of supplemental information that may direct further searches for relevant documents. In the event that a review of a relevant document determines that no key information is present, the document will be relabeled as "non-relevant." As a result, the initial relevance rule is updated to form an updated relevance rule.

According to embodiments of the present invention, an assessor reviews the relevant documents via the Assessor Terminal 114. The Assessor Terminal 114 allows the assessor to view a relevant document and highlight or identify the key information within a given document. An assessor may utilize the Assessor Terminal 114 to toggle through one or more relevant documents to highlight key information within each document. According, to certain embodiments of the present invention, multiple Assessor Terminals 114 may communicate with the Assessment Module 106 to facilitate identification of key information. In the event that multiple assessors identify conflicting key information within a given document, a supervising assessor may resolve such a conflict.

To ensure consistency among assessors when classifying a document as relevant or non-relevant, as well as identifying key information within a relevant document, documents reviewed by an assessor may be subjected to a secondary review. Following a review by an assessor, a document may be randomly selected to undergo a second review by a different assessor or supervisor to ensure that the document was properly classified, or that the key information was properly identified. This secondary review process may be used to increase the accuracy of the Document Classification System 102.

In the event that a document is identified as non-relevant, the embodiment of the present invention illustrated in FIG. 3 conducts an additional review, at step 308, of the documents labeled "non-relevant" to confirm that these documents have been correctly labeled. Given that a filter or query could incorrectly identify a relevant document as non-relevant, an assessor may review one or more of the non-relevant documents to confirm that the document is in fact non-relevant. Based on the relevance rule, the assessor may utilize the Assessor Terminal 114 to communicate with the Assessment Module 106 and confirm that a document is in fact non-relevant, in which case step 308 continues by making no change to the labeling of the non-relevant document, at step 310. Alternatively, if the document is determined to be relevant, the document is relabeled as "relevant," and process 300 continues by identifying the key information within the relevant document, at step 306.

Once the labeled documents have been refined, at step 208, as further described in FIG. 2, a query is created based on the refined documents, at step 210. The term "query" is intended to include, but is not limited to, one or more search functions which may be utilized by a classifier to identify a relevant document from within a corpus. As used herein, the term query may refer to a single search function or a group of search functions. According to embodiments of the present invention, the query may be a structured Boolean query, or other query type. For example, a Boolean query may be comprised of one or more of the words included in the relevance rules. Additional fixed-width query operators (e.g., within the same paragraph "/p," or within the same sentence "/s") may be included in the Boolean query. Furthermore, morphological variants and synonyms of the selected words may be included in the Boolean query to expand the breadth of the query.

According to embodiments of the present invention, the query may comprise one or more sub-queries wherein each sub-query is based on one or more words from within the relevance rule. The relevance rule is derived from the information contained in the user model, as well as the key information identified in the relevant documents. Given that a user may lack full knowledge of all search terms that could identify a relevant document, as key information is identified within the relevant documents, the relevance rule may be updated based on the key information. In addition, as a user becomes better acquainted with examples of relevant and non-relevant documents, the user model may be updated wherein the user provides additional information regarding a use case, scope, nuance or linguistic variability, and as a result, the relevance rule may be updated based on this additional information.

Therefore, the queries based on the updated relevance rule may identify relevant documents that would have been missed had the query been based solely on the initial user model. As a result, integrating key information derived from portions of relevant documents into the relevance rule query allows for embodiments of the present invention to supplement a user defined relevance rule with information extracted from relevant documents, thereby broadening the breadth of a query related to the relevance rule. The relevance rule may also be updated to exclude information that is non-relevant, thereby reducing instances of identifying a non-relevant document as relevant.

According to an embodiment of the present invention, a query may be generated from a relevance rule by first associating a weight with each word, phrase, string of characters, etc. (collectively referred to as a "word") included in the relevance rule. In such an embodiment, any "stop" words included in the relevance rule are first removed, wherein a "stop" word may be a commonly used word that provides little value when creating a query (e.g., "the," "and," "that," etc.). Once the stop words have been removed, each word within the relevance rule is assigned a weight based on the frequency with which the word appears in the documents that have been labeled as relevant. Words that appear with greater frequency are assigned a greater weight than words that appear less frequently. Based on the assigned weight associated with each word, Boolean queries are created by grouping words with similar weights and generating a Boolean query for each group of words. Alternatively, an embodiment of the present invention may create a query based on the n number of words with the greatest associated weight. As described above, these queries may be augmented by including fixed-width query operators, morphology variants, and synonyms.

As described above with regard to the example of a search related to litigation involving an oil spill, a relevance rule based on the user model may simply define the documents containing the word "hull" as relevant. However, by updating the relevance rule based on information within the relevant documents, the relevance rule may be expanded to include the phrase "oil bladder." As a result, a query based on the updated relevance rule may be a Boolean query configured to identify as relevant any document which contains the word "hull" or the phrase "oil bladder."

According to certain embodiments of the present invention, a conflict may arise wherein an assessor identifies key information that contradicts the current relevance rule. For example, a relevance rule may identify the word "boat" as a non-relevant word, within the context of the above-referenced example, given that the word "boat" is overly general and water vessels that carry oil are rarely referred to as boats. To reduce the number of false positive identifications based on the word "boat," the current relevance rule has identified the word "boat" as non-relevant. However, a conflict may arise wherein the key information suggests that the word "boat" should be added to the relevance rule. According to an embodiment of the present invention wherein such a conflict is present, an assessor or user may be prompted by the Document Classification System 102 to resolve this conflict. The user or assessor may analyze the conflict and determine if the relevance rule should remain unchanged or if the key information should override the current relevance rule. Returning to the example, an assessor may determine that despite the fact that the word "boat" appears in many relevant documents, identifying this word as relevant within the relevance rule would lead to instances of false identification of relevant documents. Therefore, the assessor may elect to leave the relevance rule unchanged.

According to certain embodiments of the present invention, assessors and users may be required to resolve conflicts that arise when a relevance rule identifies a document as both relevant and non-relevant. A relevance rule may provide both relevant and non-relevant words. A conflict may arise wherein a document contains words that are identified as relevant and words that are identified as non-relevant. In such an instance, a user or assessor may be required to review the document with the conflict and determine if the document is in fact relevant or non-relevant.

According to certain embodiments of the present invention, the Classification Module 108 applies the query to a document set, at step 212. Application of the query to the document set results in labeling each document within the document set as "relevant" or "non-relevant."

Following the labeling of the document set, at step 212, method 200 continues at step 214 wherein the accuracy rating of the query is measured and a determination is made whether the query meets a desired accuracy rating. The accuracy rating refers to the precision and/or recall of a given query. Precision refers to the proportion of documents identified as relevant that are in fact relevant. Recall refers to the proportion of in fact relevant documents within a document set that are identified by a query as relevant.

According to an embodiment of the present invention, the Measurement Module 110 is configured to select a sample of the documents labeled as "relevant" and "non-relevant" by the Classification Module 108 and determine the accuracy of the associated query. The Measurement Module 110 determines an accuracy rating based on the sampling and determines if the accuracy rating meets a desired accuracy rating. The desired accuracy rating may be defined by the User Terminal 112 based on the intended use in the Document Classification System 102. If the Document Classification System 102 is being used to perform an initial review of a document set, the desired accuracy rating may be lower than if the review is conducted within an active litigation.

The Measurement Module 110 may determine an accuracy rating by first selecting one or more documents from the labeled relevant and non-relevant documents. The selected documents may be manually reviewed by an assessor to determine if the relevant or non-relevant labeling is correct. An assessor may utilize the Assessor Terminal 114 to access the selected documents and perform the review. The accuracy rating may be based on the percentage of documents that are confirmed by the assessor to have been correctly labeled as "relevant" or "non-relevant" by the Classification Module 108.

According to embodiments of the present invention wherein the desired accuracy is met, the query creation process is determined to be complete. As a result, the query may be applied to additional document sets to identify relevant and non-relevant documents. For example, if the query is created for a complex litigation involving numerous document pools located on remote servers throughout the world, the query may be distributed to facilitate identification of relevant and non-relevant documents stored on each remote server. The query may be distributed electronically via electronic communication or through use of a physical storage medium.

Alternatively, if the query does not meet the desired accuracy rating, at step 214, method 200 returns to step 208 to refine the labeled documents. Through each iteration of steps 208-214, the query is updated and, as a result, the accuracy rating of the query may increase until the desired accuracy rating is reached.

In an alternative embodiment of the present invention, the accuracy rating of a query may be calculated by applying the query to a group of training documents, wherein the relevance or non-relevance of each document within the training document is known. As such, the query labels each document within the training set as "relevant" or "non-relevant." Once each document has been labeled; the Measurement Module 110 determines the accuracy rating for the given query wherein the accuracy rating is based on the percentage of documents within the training set correctly identified as relevant or non-relevant as compared to the known relevance or non-relevance of each document. The query is deemed sufficient if the query meets the desired accuracy rating. If the desired accuracy rating is not met, the query is ineffective, and Method 200 returns to step 208.

According to an embodiment of the present invention wherein a query comprises a plurality of sub-queries, an accuracy rating of each sub-query may be generated by determining whether each sub-query correctly identifies the training document as relevant or non-relevant. In such an embodiment, the query is sufficient when the aggregate accuracy rating of all sub-queries meets the desired accuracy rating.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method comprising:
generating, by a processing device, a filter for identifying a relevant document based on an initial relevance rule related to a set of documents;
applying, by the processing device, the filter to the set of documents thereby identifying a subset of relevant documents;
receiving, by the processing device from an assessor, the subset of relevant documents comprising an identification of key information;
generating, by the processing device, an updated relevance rule based on the key information and the initial relevance rule, wherein the generating comprises identifying, by the computer, a conflict between the key information and the initial relevance rule, wherein one of the key information and the initial relevance rule identifies at least one document within the set of documents to be relevant and the other of the key information and the initial relevance rule identifies the at least one document within the set of documents to be non-relevant;
generating, by the processing device, a query based on the updated relevance rule for identifying the relevant documents within the set of documents; and outputting, by the processing device, the set of documents within which the relevant documents have been identified.

2. The computer-implemented method of claim 1, wherein generating the query for searching the set of documents comprises:
selecting one or more words from a plurality of words included in the updated relevance rule, and
generating a Boolean query based on the one or more selected words.

3. The computer-implemented method of claim 1, wherein applying the filter to the set of documents to identify the subset of relevant documents comprises:
grouping the set of documents into a plurality of subsets, wherein each subset corresponds to a topic, and
identifying the subset of relevant documents, wherein the topic corresponding to the subset of relevant documents matches a relevant word included in the filter.

4. The computer-implemented method of claim 1, wherein generating the updated relevance rule comprises:
providing the key information and the initial relevance rule to an assessor to resolve the conflict, and
receiving an updated relevance rule wherein the initial relevance rule has been altered to resolve the conflict between the initial relevance rule and the key information.

5. The computer-implemented method of claim 1, wherein the initial relevance rule comprises a list of relevant words.

6. The computer-implemented method of claim 1, further comprising:
applying the query to a second set of documents to identify a set of relevant documents and a set of non-relevant documents; and
generating an accuracy rating reflecting the accuracy with which the query correctly identified the set of relevant documents and the set of non-relevant documents.

7. A system comprising:
a processing device;
a database coupled to the processing device;
an assessment module coupled to the processing device and the database, wherein the assessment module configured to:
generate a filter for identifying a relevant document based on an initial relevance rule related to a set of documents,
apply the filter to the set of documents thereby identifying a subset of relevant documents,
receive from an assessor, the subset of relevant documents comprising an identification of key information,
generate an updated relevance rule based on the key information and the initial relevance rule, wherein the generate comprising identify a conflict between the key information and the initial relevance rule, wherein one of the key information and the initial relevance rule identifies at least one document within the set of documents to be relevant and the other of the key information and the initial relevance rule identifies the at least one document within the set of documents to be non-relevant;
generate a query based on the updated relevance rule for identifying relevant documents within the set of documents, and a classification module coupled to the processing device and the database, the classification module configured to output the set of documents wherein the relevant documents have been identified.

8. The system of claim 7, wherein the assessment module is further configured to:
select one or more words from a plurality of words included in the initial relevance rule, and
generate a Boolean query including the one or more selected words.

9. The system of claim 7, wherein the assessment module is further configured to:
group the set of documents into a plurality of subsets, wherein each subset corresponds to a topic, and
identify the subset of relevant documents, wherein the topic corresponding to the subset of relevant documents matches a relevant word included in the filter.

10. The system of claim 7, wherein the assessment module is further configured to:
provide the key information and the initial relevance rule to an assessor to resolve the conflict, and
receive an updated relevance rule wherein the initial relevance rule has been altered to resolve the conflict between the initial relevance rule and the key information.

11. The system of claim 7, wherein the initial relevance rule comprises a list of relevant words.

12. The system of claim 7, further comprising a measurement module coupled to the processing device and the database, wherein the measurement module is configured to:
apply the query to a second set of documents to identify a set of relevant documents and a set of non-relevant documents; and
receive an accuracy rating reflecting the accuracy with which the query correctly identified the set of relevant documents and the set of non-relevant documents.

13. The computer-implemented method of claim 1, further comprising creating a user model based on information received from a user, wherein the user model including at least four elements.

14. The computer-implemented method of claim 13 wherein the four elements comprise use case, scope, nuance and linguistic variability.

15. The computer-implemented method of claim 13 wherein the user model represents the relevant and non-relevant documents interpreted by the user.

16. The computer-implemented method of claim 13 wherein the initial relevance rule is generated based on the user model.

17. The system of claim 7 further comprising a user modeling module coupled to the processing device and the database, wherein the user modeling module is configured to:
create a user model based on information received from a user, wherein the user model including at least four elements.

18. The system of claim 17 wherein the four elements comprise use case, scope, nuance and linguistic variability.

19. The system of claim 17 wherein the user model represents the relevant and non-relevant documents interpreted by the user.

20. The system of claim 17 wherein the initial relevance rule is generated based on the user model.

* * * * *